United States Patent [19]
Ledjeff et al.

[11] Patent Number: 5,863,672
[45] Date of Patent: Jan. 26, 1999

[54] POLYMER ELECTROLYTE MEMBRANE FUEL CELL

[75] Inventors: Konstantin Ledjeff, Bad Krozingen; Roland Nolte, Denzlingen, both of Germany

[73] Assignee: Fraunhofer-Gesellschaft zur Foerderung der angewandten Forschung e. V., Munich, Germany

[21] Appl. No.: 849,624

[22] PCT Filed: Dec. 5, 1995

[86] PCT No.: PCT/DE95/01752

§ 371 Date: Jun. 4, 1997

§ 102(e) Date: Jun. 4, 1997

[87] PCT Pub. No.: WO96/18216

PCT Pub. Date: Jun. 13, 1996

[30] Foreign Application Priority Data

Dec. 9, 1994 [DE] Germany .............................. 4443945.8

[51] Int. Cl.$^6$ .............................. H01M 8/04; H01M 8/10
[52] U.S. Cl. .............................. 429/26; 429/32; 429/33; 429/34

[58] Field of Search .................................. 429/26, 30–34, 429/38, 39

[56] References Cited

U.S. PATENT DOCUMENTS

| | | | |
|---|---|---|---|
| 3,507,704 | 4/1970 | Webb | 429/34 X |
| 4,649,091 | 3/1987 | McElroy | 429/34 |
| 4,826,741 | 5/1989 | Aldhart et al. | 429/26 X |
| 5,045,169 | 9/1991 | Feduska et al. | 429/26 X |
| 5,262,249 | 11/1993 | Beal et al. | 429/26 |

*Primary Examiner*—Anthony Skapars
*Attorney, Agent, or Firm*—Marshall & Melhorn

[57] ABSTRACT

The invention relates to a PEM fuel cell comprising at least one strip membrane (8) which itself comprises at least 2, and a maximum of 10,000-surfaced individual cells each comprising an electrode layer (10–12, 13–15) applied on both sides of a membrane made of a polymeric solid electrolyte, the individual cells being incorporated in series and being made of plates (21, 22) of non-conductive material, which serve as heat exchangers and as fuel gas supply device, which are contacted on both sides on the strip membrane (8, 16) and separate outwardly-directed conductive structures (23, 24) for voltage derivation.

18 Claims, 8 Drawing Sheets

OVERALL CELL VOLTAGE

POLYMER ELECTROLYTE MEMBRANE FUEL CELL

FIELD OF THE INVENTION

The invention relates to a PEM fuel cell comprising strip membranes and plates made of non-conductive material, the current being derived via separate electrically conductive structures.

BACKGROUND OF THE INVENTION

PEM fuel cells (Polymer Electrolyte Membrane fuel cells) are electrochemical cells which, to simplify, comprise anode and cathode with interposed polymeric solid electrolyte. In order to operate such cells, fuels are continuously applied to both electrodes from the exterior, said fuel being there electrochemically converted, so that a current can be derived at the electrodes. It is now at present however, impossible to convert all of the chemical energy supplied. During operation of the fuel cell a certain proportion is always lost as heat. For this reason, higher-performance fuel cells require measures for heat removal. This is effected according to prior art by electrically conductive heat exchanger plates through which a cooling fluid flows (Literature: A. J. Appley, E. B. Yeager, Energy 11, 137.152 [1986]).

In this case both sides of the membrane-electrode unit are in contact with the electrically conductive plates, interposed seal rings being used in order to achieve a tightness of the cell. The conductor plates are designed as heat exchangers, i.e. they contain ducts through which a cooling fluid flows. The cooling fluid is fed in and out through openings in the plate. Furthermore, feed and return ducts for the fuels are integrated in the electrically conductive plates, the fuels then being supplied through suitable structures to the electrodes. It is however necessary for such a fuel cell construction according to prior art for the plates to consist of electrically conductive material, as each plate must press against the respective electrode surface in order to produce the outward electrical contact of the cell. In the case of a stack structure, the plates can also be constructed as bipolar plates.

In order to achieve higher performance and particularly in order to achieve a higher voltage, it is also known to incorporate together a plurality of membrane-electrode units as described above to form a so-called fuel cell stack (U.S. Pat. No. 4,175,165 "Fuel cell system utilizing ion exchange membranes and bipolar plates"). For this purpose until now a plurality of cells as described above were separately constructed, disposed one behind the other and incorporated electrically in series, so that the voltages of the individual cells are added to one another. The constructive outlay for such an in-series incorporation is however extremely high, as each membrane-electrode unit must have a separate fuel supply. The result is an extremely high constructive outlay for these cells.

SUMMARY OF THE INVENTION

Proceeding from this point, the object of the present invention is to indicate a PEM fuel cell which in addition to having high output voltages, has an extremely simple and cost-effective structure.

This object is achieved by the characterising features of claim 1. The sub-claims illustrate advantageous further developments.

Thus it is proposed according to the invention to construct a PEM fuel cell from so-called membranes and plates contacted thereon on both sides of electrically non-conductive material, the current being derived through separate conductive structures passing to the exterior.

By means of using electrically non-conductive plates a situation is achieved in which strip membranes can be used in a PEM cell without the occurrence of a short circuit of the individual cells of a strip membrane between one another. Thus an essential feature of the invention is the use of novel strip membranes and their contacting with plates which serve as heat exchangers and as a fuel gas supply device, from electrically non-conductive material. In this way now PEM fuel cells may be produced with a simple structure and a high output voltage. The voltage can be further increased if so-called fuel cell stacks are produced by incorporating one behind the other a plurality of individual cells with the structure described above.

The strip membrane used according to the invention comprises specially-incorporated individual cells. On the one hand it is possible for the individual cells to be incorporated either via electronically conductive areas, or by a stepped arrangement.

For the first embodiment of the strip membranes, the incorporation is effected in such a way that areas disposed in a plain fashion next to one another are provided with different conductivities.

In this respect an area is formed by the individual cell itself. In order to ensure ion conductivity, the individual cell is made of an ion-conductive material. For this purpose polymeric solid electrolytes in the form of membranes are used. As either cations or anions must be transported, the membrane must be permeable either to cations or to anions. Generally, ion conductivity in an aqueous environment for cation-conductive polymers is provided if there are present in the polymer securely anchored, i.e. generally secured by chemical bonding, carbonic acid groups and/or sulphonic acid groups and/or phosphonic acid groups. Ion conductivity in particular is provided for anion-conductive polymers if the polymer contains amino groups, quaternary ammonia groups or pyridinium groups. The capacity for ion conductivity is generated in the possibilities previously described in that securely anchored ions exist in the membrane, or are generated by swelling in water.

Examples of cation-conductive polymers of this type are sulphonated polysulphones, polyether sulphones or also polyether ketones.

In this case the thickness of the membrane can lie in a range between 0.5 $\mu$m and 1 mm, preferably in a range from 10 $\mu$m to 200 $\mu$m. The surface areas of the membrane for the individual cell depend in this case on the required power of the stack. The areas can lie in a range between 1 $mm^2$ to 1,000,000 $mm^2$, preferably in a range from 100 to 10,000 $mm^2$.

In order to enable its function as an individual cell, the membranes described above are coated on both sides with electrode material. As the electrochemical conversions of the cell take place on the electrodes, the electrodes can either consist themselves of the material which is electrochemically converted, or of a material which catalyses the electrochemical conversion. The material must be electronically conductive and in particular comprises metals, metal oxides, mixed oxides, alloys, carbon, electrically conductive polymers or mixtures thereof.

The materials can contain additives which serve to adjust hydrophilia and hydrophobia. Thus the electrode coatings for example can be provided with water-repellent properties. Furthermore, additive materials are possible which permit the adjustment of a certain degree of porosity. This is of particular importance when gaseous materials are catalytically converted at the electrodes, a three-phase contact being necessary between gas, catalyst and ion-conductive area. Further, so-called binders can be added, which simplify the stable and effective bonding of the electrode to the ion-conductive area.

This individual cell constructed in such a manner is now incorporated electrically in series with the aid of flat electronically conductive areas with other individual cells.

The electron-conductive areas have the purpose of producing an electronic conductivity respectively between one electrode surface of one individual cell and the electrode surface of the next individual cell disposed on the other side of the membrane.

Materials are used for the electronically conductive areas which, instead of the ion-conductivity of the individual cell, now have an electron conductivity. The function of the strip membrane is independent of specific polymeric materials for the electron-conductive areas as long as the capacity of the materials for electron conductivity is provided. Electron conductivity in polymeric materials can be achieved by using polymers which, due to their molecular structure, are capable of achieving electron conductivity, as is the case for example with polyacetylene or polythiophenes.

The electron conductivity can also be produced if a specific proportion of conductive substances is mixed with a non-conductive polymer. The conductive substances involve particularly high-conductivity soot, graphite, carbon fibres, particles or fibres of polymers themselves electronically conductive, metal particles, flakes or fibres or metallised carrier materials.

The polymers can contain additives for altering the swelling behaviour in water. This is of particular importance when the membrane is used in an aqueous environment. In this case ionically conductive areas of the membrane provided with charged groups swell, which becomes apparent in an alteration in the geometrical dimensions. Other areas which are not provided with charged chemical groups, on the other hand, scarcely swell at all, so that mechanical tensions arise at the adjoining surfaces of both layers. In order to avoid this there can be mixed with the areas not provided with charged groups an additive, which adapts the swelling behaviour of both.

It is an essential feature of the invention that the individual cells described above are incorporated in series via the electronically conductive areas. For this purpose either the lower electrode surface of a membrane of an individual cell is connected via the electronically conductive areas to the following individual cell, and here in fact connected to the upper electrode surface. The reverse is naturally just as possible, in that the upper electrode surface of a first individual cell is connected via the electronically conductive area with the lower electrode surface of the next individual cell.

With such a structure, the electrode-coated ionically conductive areas (which correspond to one individual cell) directly adjoin the electronically conductive areas. In order to prevent the coated upper and under side of the ionically conductive area from being short-circuited at this border by the electronically conductive areas, which would mean failure of the individual cell, the electrode coatings may not be applied as far as the edge of the ionically conductive material. Respectively only the upper or the lower electrode coating of an individual cell may be connected with the adjacent electrically conductive area in an electrically conductive manner. This is achieved in that, on one side of the ion-conductive area, the region between the electrode coating and the electronically conductive area is coated with electronically conductive structures, so that a defined electrical incorporation as described above of the individual membrane areas becomes possible. The material used for this consists either of the materials described under those for the electronically conductive areas or of the materials described under those for the electrode coating of the membrane.

In this way an in-series incorporation of the separate individual cells via the electronically conductive areas is achieved. In this case the dimensions of the electronically conductive area correspond in thickness and width approximately with those of the individual cell, so that in all a flat strip membrane results, which consists of periodically repeated areas, i.e. on the one hand of the individual cell and on the other hand of the electronically conductive areas.

According to a preferred embodiment it is now proposed to dispose insulated areas between the individual cells and the electronically conductive areas. The dimensions (thickness, width) in this case approximately correspond to those of the individual cell or of the conductive area.

These areas serve for electrical insulation between the areas of different conductivities. For this reason they consist both of ionically and of electronically non-conductive polymeric material. The function of the strip membrane in this case is independent of specific polymeric materials for the non-conductive areas, as long as the materials are neither ionically nor electronically conductive. Therefore there are used such polymeric materials as come neither under the category "materials for the ion-conductive areas of the membrane units" nor under the category "materials for the electronically conductive areas".

When the membrane is constructed with insulated areas, contrary to the structure without insulated areas, the electrode coatings can have the same area as the ion-conductive membranes.

In order to provide in-series incorporation in this embodiment of the invention, it must be ensured that a connection via the electronically conductive areas with the lower or upper electrode surface of the individual cells is guaranteed. This is made possible in that the strip membrane is coated in specific areas, i.e. on the upper or lower membrane area of the insulated area, with electronically conductive structures, so that a defined electrical incorporation of the individual membrane areas is possible, in such a way that one electrode surface of one individual cell is respectively connected with the electrode surface of the next individual cell on the other side of the membrane. The material used for this purpose consists either of the materials described under the category of materials for the electronically conductive areas, or of materials coming under the category of materials for the electrode coating membrane.

A strip membrane which according to the preferred embodiment also contains additional insulated areas, is accordingly constructed from periodically repeated areas of the individual cell, the insulated area and the electronically conductive area. The strip membrane preferably comprises from 2 to 300 individual cells.

In the embodiment with the stepped configuration, the in-series incorporation is achieved in that the electrode surface of an individual cell at the same time takes over the purpose of an electronically conductive area. A separate electronically conductive area is omitted in this case, as are insulated areas. In order in this case to ensure an in-series incorporation of two individual cells, the cells overlap in such a way that the lateral region of an electrode surface of the first individual cell is directly conductively connected with the lateral region of the electrode surface on the other side of the membrane of the next individual cell. There results in this case a strip membrane in which the individual cells are aligned to one another in a step-like overlapping configuration. The structure of the individual cell corresponds to the type described above.

The strip membranes described above is contacted according to the invention with plates which are made from a non-electronically conductive material. In this way a short-circuit is avoided of the individual electronically conductive area of each strip membrane between themselves.

As the plates are non-conductive, current derivation must be ensured.

For PEM fuel cells which have only one strip membrane (individual cell) it is now proposed that the necessary current derivation be effected by means of individual separate electronically conductive structures. These structures are passed upwards or downwards out of the fuel cell. The structures are respectively disposed between the end plates and an electrode surface of the strip membrane. In this case the plates then function as end plates.

For a fuel cell stack a modification of the individual cells described above is now necessary. As current conduction of the individual strip membranes incorporated one behind the other must be ensured, it is proposed according to the invention to interconnect the individual strip membranes in the fuel cell stack by electronically conductive structures; current derivation can then, as already described above with reference to the individual cell, be effected by means of separate conductive structures (current taps) which are electronically conductive and are part of the fuel cell. These current taps are more advantageously disposed between the end plates and the electronic surface of the final strip membrane. The plates proposed according to the invention function in the fuel cell stack described above on the one hand for the internally-lying strip membranes as centrally-located plates, and as end plates.

A further preferred embodiment proposes that, in order to increase the transverse conductivity of the electrode surfaces, fuel-permeable, electronically conductive structures be pressed on to the electrode surfaces of the electrodes of the individual strip membranes. These have the purpose of minimising the ohmic losses of the electrode surfaces during operation of the cell. As they must also simultaneously enable supply of the electrodes with fuel, they are permeable, i.e. fuel-permeable. A variant of these electronically conductive structures is so constructed that an overall structure is provided which on the one hand comprises non-conductive, fuel-permeable, and on the other hand conductive areas. This overall structure can also form a unit with the structures provided for current derivation.

The plates according to the invention also of course simultaneously serve as heat exchanger plates and are thus provided with cooling structures. These cooling structures can be in the form of ducts or cavities and have a corresponding cooling medium, e.g. water flowing therethrough. In order to supply the cooling structures, coolant feed ducts and coolant return ducts are provided. With fuel cell stacks it is advantageous if the feed and return cells do not open on the exterior of the cell, but are passed to central cooling water supply ducts. These supply ducts then pass through the entire cell structure, i.e. each heat exchanger plate contains corresponding bores. The alignment with one another of at least two plates with these holes then forms the cooling water supply duct and this latter is supplied from the exterior with coolant, or leads the coolant back outwards again.

As already shown, the object of the plates resides not only in the fact that the heat arising during reaction is removed, but simultaneously in that fuel supply to the electrode surfaces must be ensured. For this purpose the plates contain, on the side facing the membrane, so-called distributor structures, which enable as far as possible all electrode surfaces of a strip membrane to be supplied with fuel. These fuel structures must be of such design that the fuel impinges on the electrode surface over the largest possible area. This may be effected for example by large-area recesses in the plate or by duct structures disposed in parallel, or by ducts disposed in a chequered fashion or if necessary by a porous structure of the heat exchanger plate.

According to the present invention, for the case for example where duct structures are provided for fuel supply, the plates must also contain fuel supply ducts. The fuel is then fed in through these fuel supply ducts and distributed via the corresponding distributor structures to all the electrodes of one side of a membrane. In the design according to the present invention it is also possible for the distributor structure to have an additional fuel return duct, so that foreign matter or inert material which accumulates in the interior of the cell can be washed out through this return duct.

In the case of fuel cell stacks it is also advantageous for the fuel supply if this is ensured via so-called supply ducts. These supply ducts, similar to the cooling water supply, pass through the entire cell structure, i.e. each heat exchanger plate includes corresponding bores. The alignment with one another of at least two plates with these bores then forms the corresponding supply duct and this is then supplied from the exterior with fuel or removes fuel to the exterior.

Alternatively to the fuel supply described above, by means of the plates it is also possible for the entire plate to be made of porous material and for fuel supply to be effected by passing the fuel gas, e.g. air, through this porous material. Cooling in this case is achieved in such a way that the cooling structures, e.g. tubes or tube bundles, pass through the porous plate, in order to remove the heat occurring. The cooling structures must then naturally consist of a non-porous material, so that mixing of coolant and fuel is avoided. The fuel itself in this embodiment of the invention is supplied over a wide area on the side facing away from the membrane and is passed through the porous structure as far as the electrodes. In order to prevent an escape to the exterior, the edge of the plate must consist of non-porous dense material. The whole-surface fuel supply can then be effected by simple blowing (air) on the porous plate, or in that the fuel is distributed through an additional structure from the supply line on to the overall porous heat exchanger surface, without the emergence of fuel to the environment being in this case possible.

Any removal of the fuel is effected e.g. at the sides of the plate, so that a flow can take place from the feed side through the porous structure to the electrodes and then laterally to one or to a plurality of return openings. In the simplest case, the return openings comprise openings in the dense edge of the plate, so that the fuels can pass through the porous structure of the plate to the return opening. However, return ducts may also be present in the plate, i.e. empty ducts which lead to the exterior from the electrodes.

As shown above, in the case of fuel cell stacks, the plates operate both as centrally-located plates and also as end plates. The structure of the end plates is similar to what has been described above. The centrally-located plates (bipolar plates) must then naturally have on both sides a distributor structure so that it is possible to supply all the electrode surfaces of the adjacent side of the strip membrane with the respective fuel. The structure of the distributor structures is similar to what has been described above for the end plates. In the fuel cell stack it must also be taken into account that an electronic conductivity of the separate individual cells with one another must be guaranteed. This is achieved according to the invention in that bridging electronically conductive structures are provided. Current derivation can then respectively be effected as already described for the individual cells, by means of separate electronically conductive structures (current taps) passed outwards out of the fuel cell.

The individual cell components, i.e. the plates, the strip membrane and the current taps are if necessary pressed on to one another by means of gaskets in order to ensure fuel-tightness of the entire cell structure. Preferably, gaskets are inserted between the strip membrane and the plates. When using the overall structures already described above for improving the transverse conductivity of electrodes, it can also be necessary to insert a respective gasket between the strip membrane and the overall structure and between the overall structure and the non-conductive plate.

As shown above, it is an essential feature in the invention that plates of non-conductive material are used. Examples of such materials are non-conductive plastics, but also ceramic or oxidic materials. Electrically conductive materials can be used which have been subsequently covered by a non-conductive layer. This may be effected for example by means of thin-layer processes such as plasma polymerisation or by the application of thin polymer films by means of gluing, welding or by the application/vaporisation of polymer solutions. Materials are preferably used which have sufficient chemical stability under fuel cell conditions (e.g. stable in the presence of hydrogen and oxygen, hydrolytically stable and temperature-stable up to 100° C.). In selecting a material care should be taken that materials are used which have a high thermal conductivity in order thus to dissipate as much heat as possible from the cell structure.

The current tap structures consist, as shown above, of an electrically conductive material. Examples of such materials are all metals such for example as titanium. The current tap structures can involve flexible films or also mechanically inflexible pieces. Preferably used are materials which are chemically inert under fuel cell conditions (e.g. stable against water, hydrogen and oxygen up to 100° C.) and which are electrochemically stable against the occurring potentials.

The structures reinforcing the transverse electrode conductivity are, as already shown, made of electronically conductive material. Examples of possible materials are metallic meshes, porous metal structures or fuel-permeable carbon or graphite papers. The structures can be flexible or inflexible pieces. Here preference is given again to materials which are chemically inert under fuel cell conditions.

The overall structures reinforcing the electrodes' conductivity comprise an alignment with one another of areas which are electronically conductive and which are not conductive. The conductive areas, which stand opposite the electrode surfaces of the strip membrane, comprise electronically conductive materials as already described above.

The overall structure can be built up for example from the individual surfaces which are permanently interconnected by means of gluing or welding technology. Alternatively, porous non-conductive basic members can also be used which have been subsequently coated on the surfaces lying opposite the membrane electrodes with non-dense, electronically conductive coatings. The application of such coatings can in turn be effected by thin-layer processes known from prior art such as PVD or CVD.

BRIEF DESCRIPTION OF THE DRAWINGS

Further features, details and advantages of the invention will become apparent from the drawings, which show.

DETAILED DESCRIPTION OF THE PREFERRED EMBODIMENT

Figure 1:
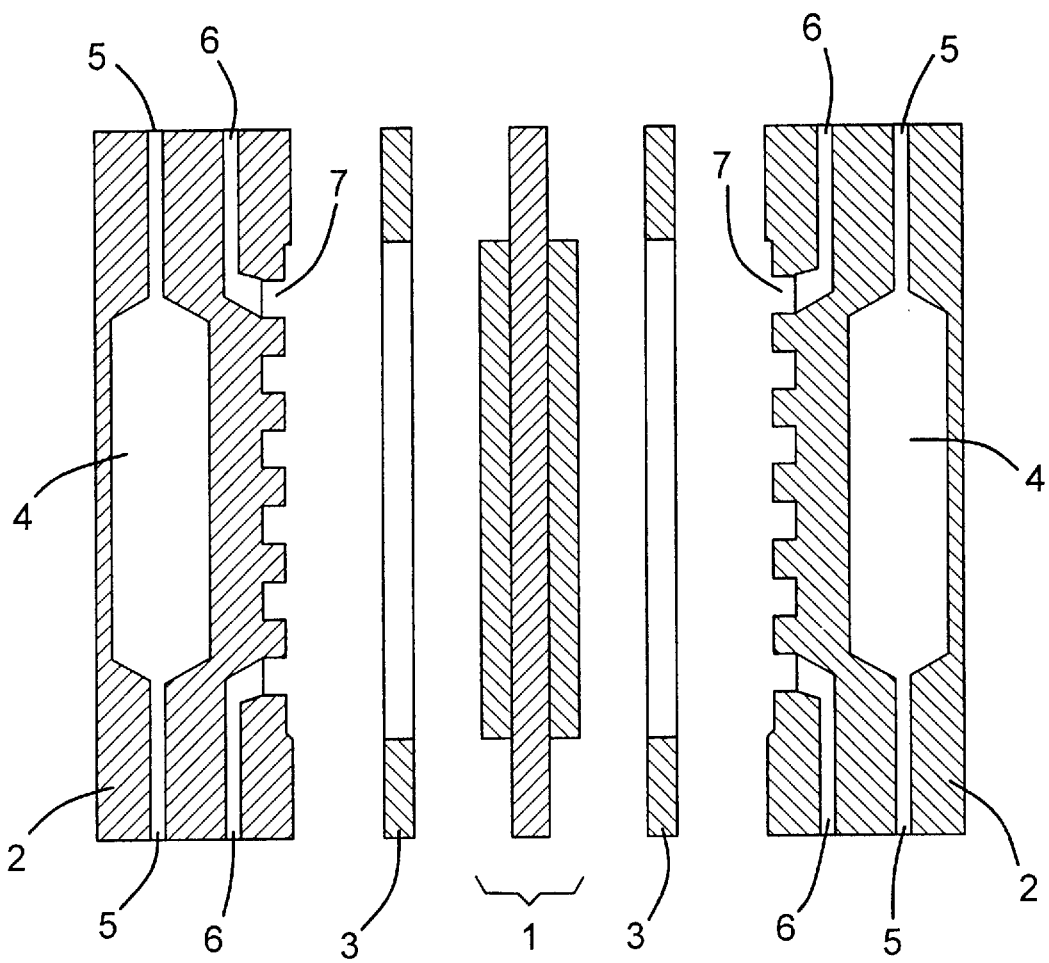
FIG. 1: a vertical section of the most important components of a PEM fuel cell according to prior art.

FIG. 1 shows in vertical section the most important individual parts required for the construction of a PEM fuel cell according to prior art. A PEM fuel cell according to prior art (e.g. A. J. Appley, E. B. Yeager, energy 11, 137–152 [1986]) is in this case constructed from a membrane electrode unit 1, corresponding gasket rings 3 and electrically conductive end plates 2. In the assembled condition, both sides of the membrane electrode unit 1 are in contact with the electrically conductive plates 2; in order to seal the cell, interposed gasket rings 3 are provided. The conductive plates 2 are also conceived in prior art as heat exchangers, i.e. they contain ducts 4 through which a cooling fluid flows. The cooling fluid in this case is fed and returned via apertures 5 present in the plate. Further, there are integrated in the electrically conductive plates 2 feed and return ducts 6 for the fuels, the fuels then being brought in through appropriate structures 7 to the electrodes. For such a fuel cell construction according to prior art it is necessary for the plates 2 to be made of electrically conductive material, as each plate must press against the respective electrode surface of the membrane electrode unit 1, in order to produce the electrical contact of the cell with the exterior. In the case of a stack construction, the plates 2 can also be constructed as bipolar plates.

Figure 2:
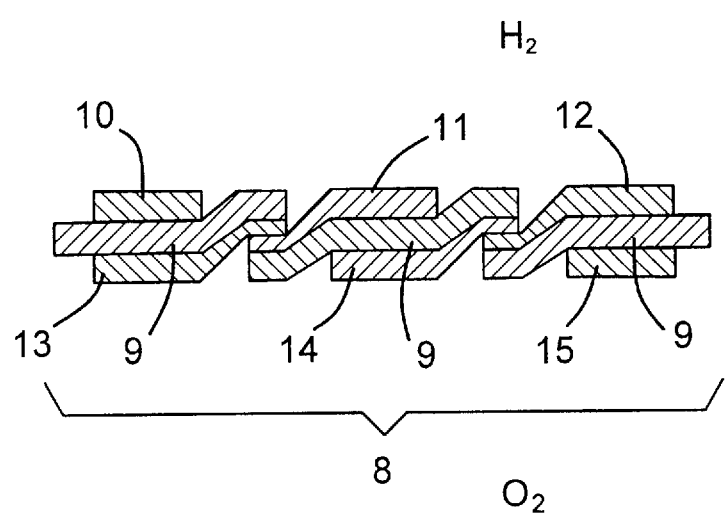
FIG. 2: in vertical section, the construction of a strip membrane according to the invention in a step-shaped configuration.

FIG. 2 now shows in vertical section an embodiment according to the invention of the strip membrane. The strip membrane 8 in the embodiment according to FIG. 2 is in a step-shaped configuration. Accordingly the strip membrane 8 comprises a number of ionically conductive solid polymeric membrane areas 9, each side of a membrane area 9 being coated with an electrode structure. In the case of a hydrogen/oxygen fuel cell, each ionically conductive membrane area 9 is thus coated with a hydrogen electrode 10, 11, 12 and an oxygen electrode 13, 14, 15, and operates as a fuel cell unit. Each two adjacent membrane areas are connected to one another, the lower electrode 13 of the first membrane area being connected in an electronically conductive, gastight and permanent manner with the upper electrode 11 of the second membrane area. In this way there is produced a membrane-internal incorporation in series of all the fuel cell units in the membrane 8, and the total voltage can be derived at the first electrode 10 of the upper membrane side and the last electrode 15 of the lower membrane side. The strip membrane 8 shown in FIG. 2 in comparison to a single cell, provides three times as much output voltage, as it includes three coated ionically conductive membrane areas. Despite this, such a strip membrane 8 requires only one fuel supply for the upper membrane side (hydrogen in FIG. 2) and only one fuel cell supply for the lower membrane side (hydrogen in FIG. 2).

In the strip membrane 8 proposed according to the invention it is in fact necessary, as with previous membrane electrodes, to remove heat. According to the invention, however, only one plate is required for dissipating the heat from the three units. However it is no longer necessary now to use the electronically conductive plates used according to prior art, as otherwise a short circuit would occur. Therefore according to the invention electronically non-conductive plates are used.

Figure 3:
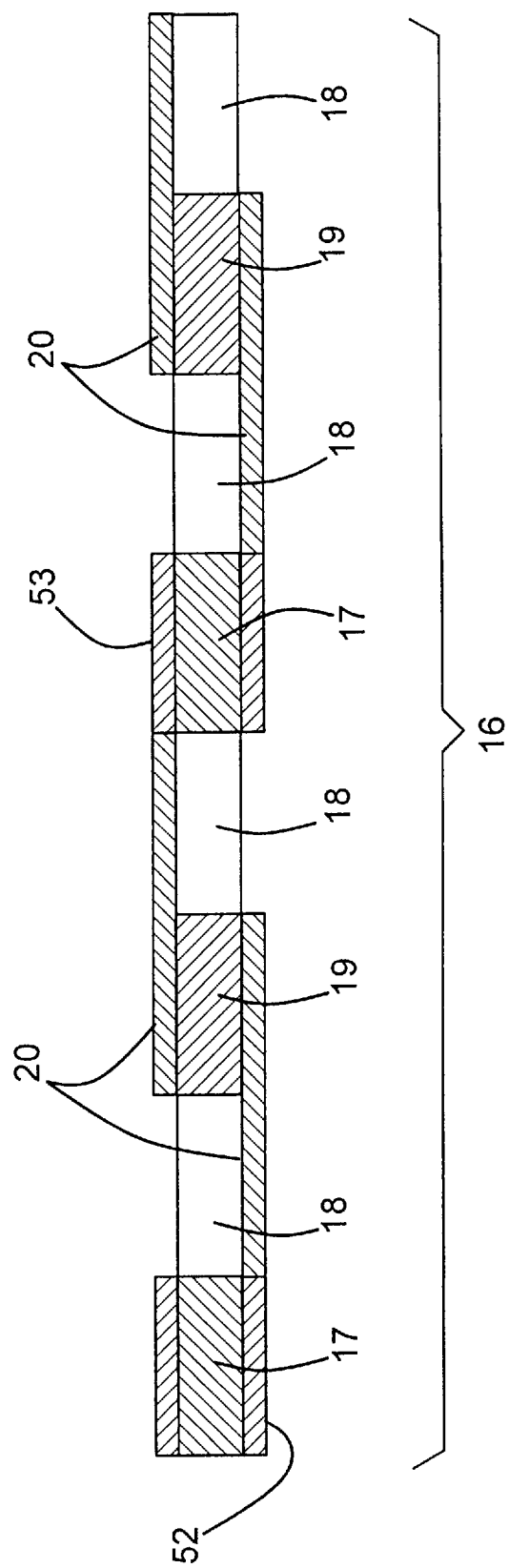
FIG. 3: a construction according to the invention of a strip membrane with individual cells disposed one after the other.

FIG. 3 shows, likewise in section, a strip membrane 16, the strip membrane in this case being constructed in the form of individual cells 17 disposed one behind the other. The separate individual cells 17 are separated from one another by insulated areas 18. Disposed between these areas 18 are purely electronically conductive areas 19. A decisive factor in this strip membrane is that the lower electrode surface 52 of the first individual cell 17 is incorporated in series via an electronically conductive coating 20 with the upper electrode surface 53 of the next individual cell 17. The periodic sequence of such units shown in cross-section in FIG. 3, forms a strip membrane.

This strip membrane according to the invention can, just as was described above for the step-like configuration, be constructed with the heat exchanger plates made of non-electronically conductive material in order to form a PEM fuel cell.

Figure 4:
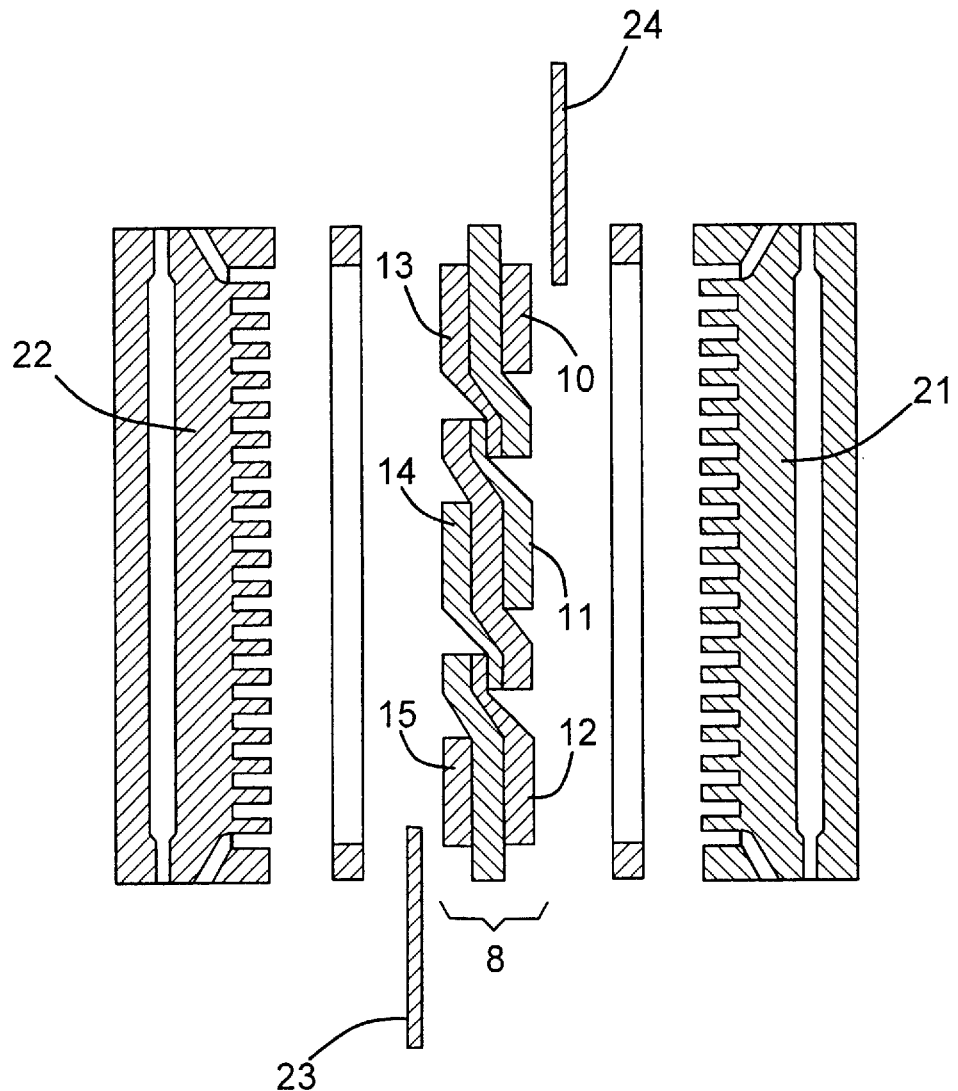
FIG. 4: a vertical section through the most important components for the structure of a PEM fuel cell (individual cell) according to the invention.

FIG. 4 now shows in vertical section the most important individual parts for building up a PEM fuel cell according to the invention. The embodiment in FIG. 4 shows a PEM fuel cell comprising a strip membrane 8. The structure of the strip membrane 8 corresponds to the structure of the strip membrane according to FIG. 2. In contrast to prior art (see FIG. 1) plates 21, 22 of electronically nonconductive material or with electronically nonconductive surface are now used. The derivation of electrical voltage from the membrane 8 is effected by outwardly-aligned electronically conductive structures 23, 24 (current taps). These current taps 23, 24 are impermeable to the respective fuel used, and are electrically connected with the first electrode 10 or the last electrode 15 of the strip membrane 8.

The structure of the plates 22, 21 in relation to the heat exchanger structures and the fuel supply substantially corresponds to that in FIG. 1.

Figure 5:
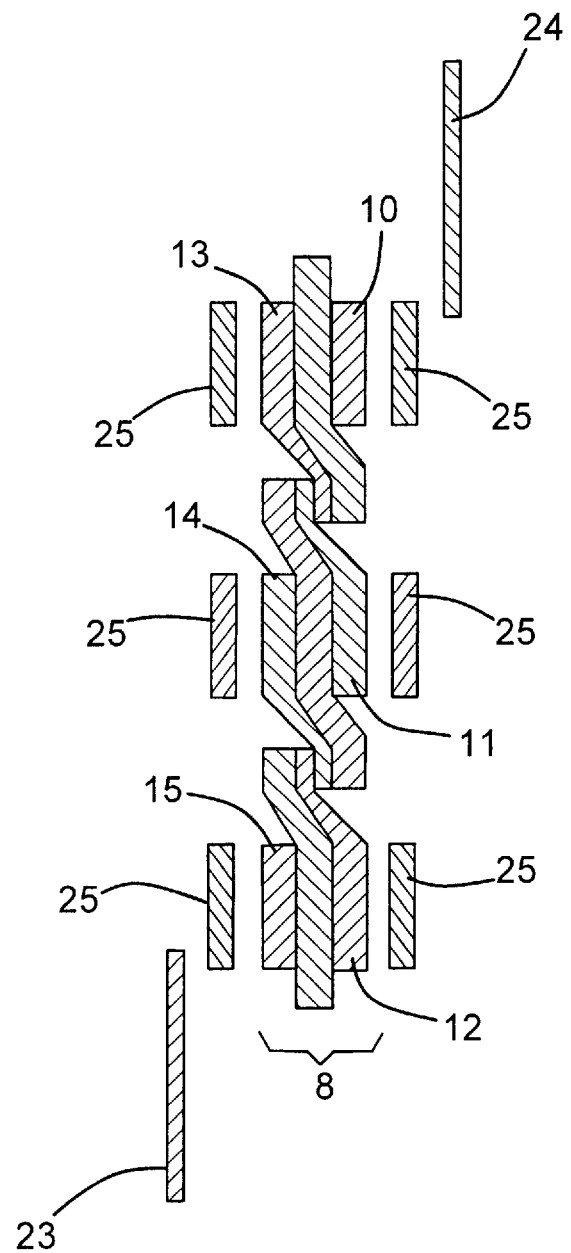
FIG. 5: in vertical section a strip membrane according to the invention as in the embodiment in FIG. 2 with additional electronically conductive structures.

More typically, in order to increase the transverse conductivity of the electrode surfaces of the strip membrane 8, fuel-permeable electronically conductive structures 25 are in addition used. This is shown diagrammatically in cross-section in FIG. 5. These electronically conductive structures 25 are pressed according to the invention onto the electrode surfaces 10 to 12 or 13 to 15 of the strip membrane 8. They have the purpose of minimising the ohmic losses of the electrode surfaces during operation of the cell, but must at the same time enable supply of the electrodes with the fuel, i.e. they must be permeable to the fuel.

Figure 6:
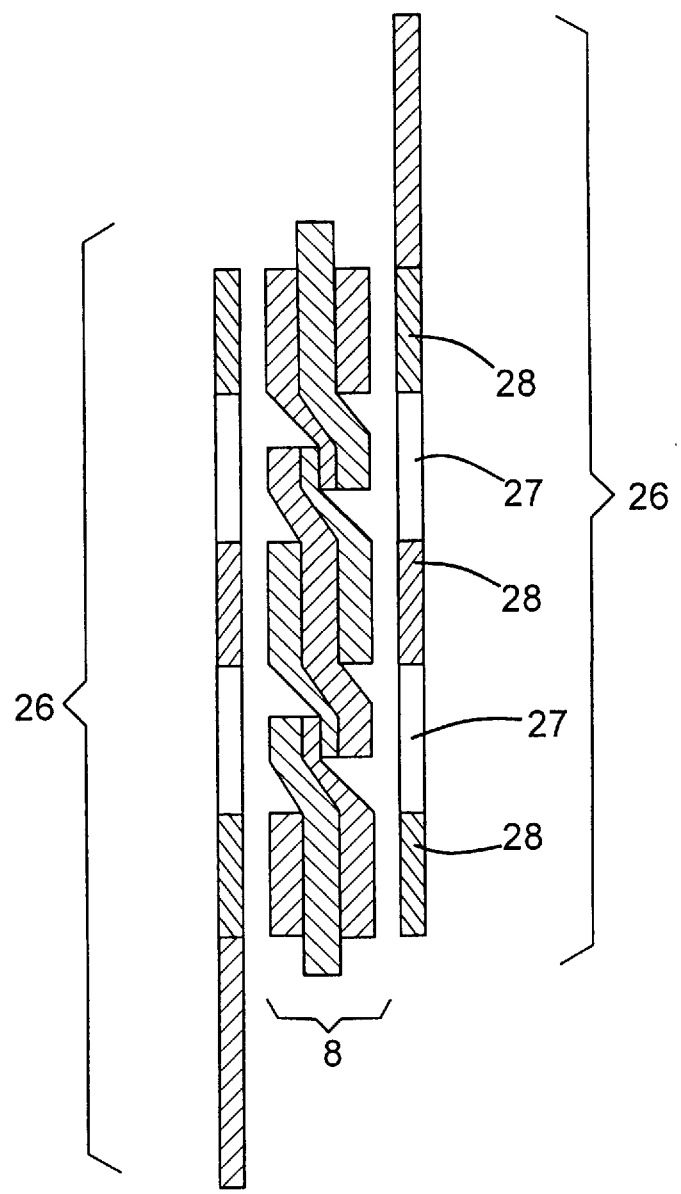
FIG. 6: a strip membrane according to the invention as in the embodiment in FIG. 2 with an additional overall structure for increasing the transverse conductivity.

A further variant of the invention (FIG. 6) proposes to design the conductive structures 25 according to FIG. 2 in the form of an overall structure 26. This overall structure comprises alternating non-conductive areas 27 and fuel-permeable conductive areas 28. The overall structure 26 is so disposed that the respective conductive and permeable areas are disposed on the electrode surfaces of the strip membrane 8. The current taps 23, 24, as shown may also be integrated in this overall structure, so that a one-piece overall structure results.

Figure 7:
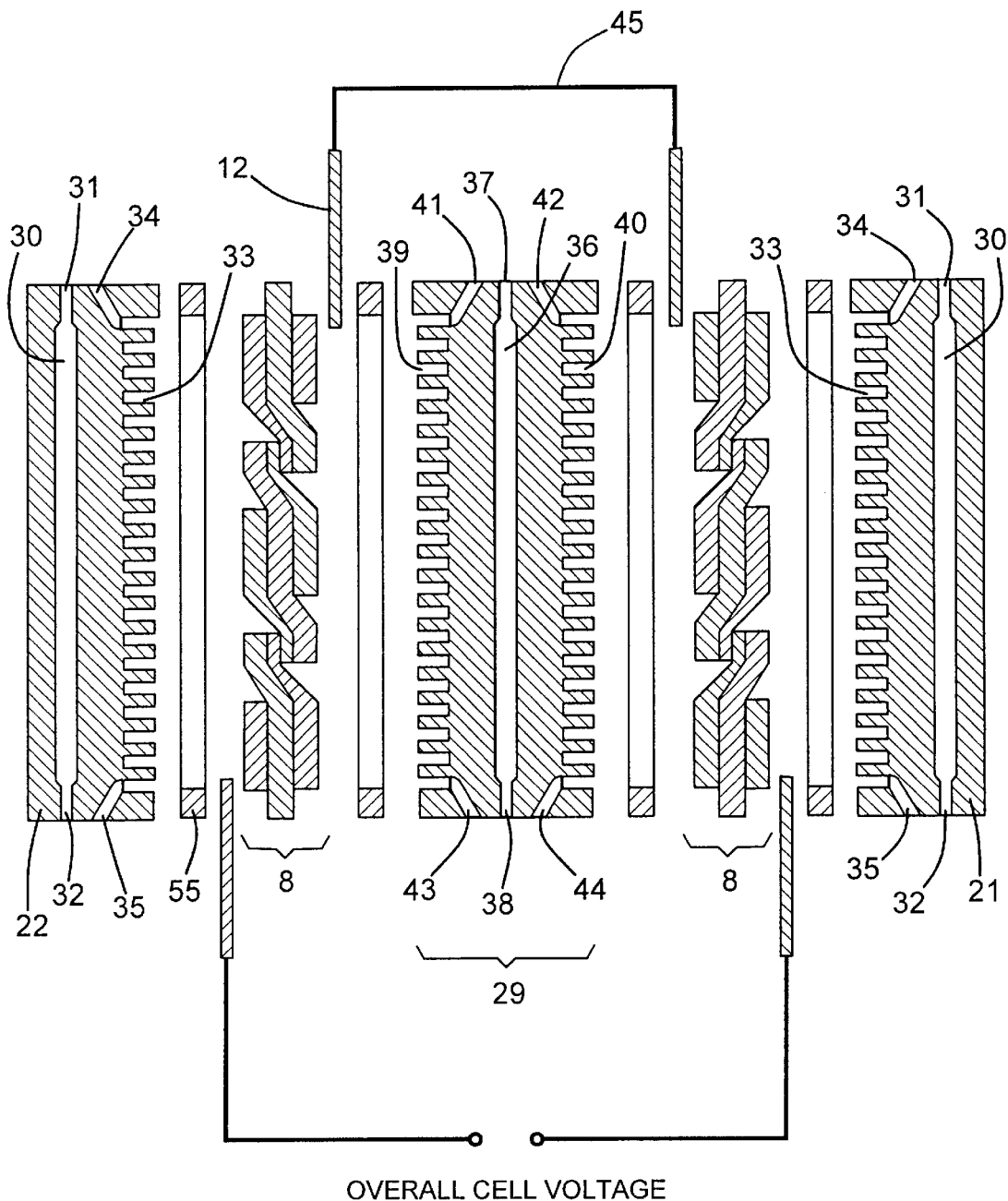
FIG. 7: the most important components in vertical section, which are necessary for constructing a fuel cell stack according to the invention.

FIG. 7 shows in cross-section the most important components necessary for construction according to the invention of a fuel cell stack. FIG. 7 shows here by way of example a fuel cell stack comprising two strip membranes 8, two end plates 21 and 22 in the form of heat exchangers, and a centrally-located plate 29 in the form of a heat exchanger. The end plates 21 and 22 as was already known from prior art, cooling structures 30 through which a corresponding cooling medium, e.g. water, flows. In these cooling structures, ducts or cavities in the heat exchanger plates 21 or 22 can be involved. The cooling structures are connected to a coolant supply duct 31, through which coolant is fed from the exterior and flows through the cooling structure 30. The coolant passes out of the heat exchanger plate 21 or 22 through a coolant return duct 32. It is further possible for the feed and return ducts 31, 32 not to open at the exterior of the cell, but to lead firstly to so-called cooling water supply ducts (not shown). These supply ducts then pass through the entire cell structure, i.e. each heat exchanger plate contains corresponding bores. The end plates 21, 22, made of non-conductive electronic material, then receive, in addition to the supply to the electrodes, so-called distributor structures 33, which permit all the electrode surfaces on the side of the strip membrane 8 to be supplied with fuel. In this structure there may be a large-area recess in the plate 21, 22, or duct structures disposed in parallel, or ducts disposed in a chequered configuration, or a structure of the heat exchanger plate which is porous at this point. In supplement, feed and return ducts 34 and 35 can be provided. For this purpose also there is provision in the stacked configuration for the provision of central supply ducts for the feeding fuel.

The centrally-located plate 29 is similar in construction. The centrally-located plate 29 likewise includes cooling structures 36 with corresponding feed and return ducts 37, 38 and similar distributor structures 39, 40. This burner structure 39 and 40 can also again be connected by separate feed and return ducts 41 to 44.

In order to produce the electronic circuit, it is still necessary in the stacked configuration for the individual strip membranes 8 to be incorporated one behind the other by special electronically conductive structures 45.

Gaskets 55 are necessary in order to ensure the seal in cell structure.

Figure 8:
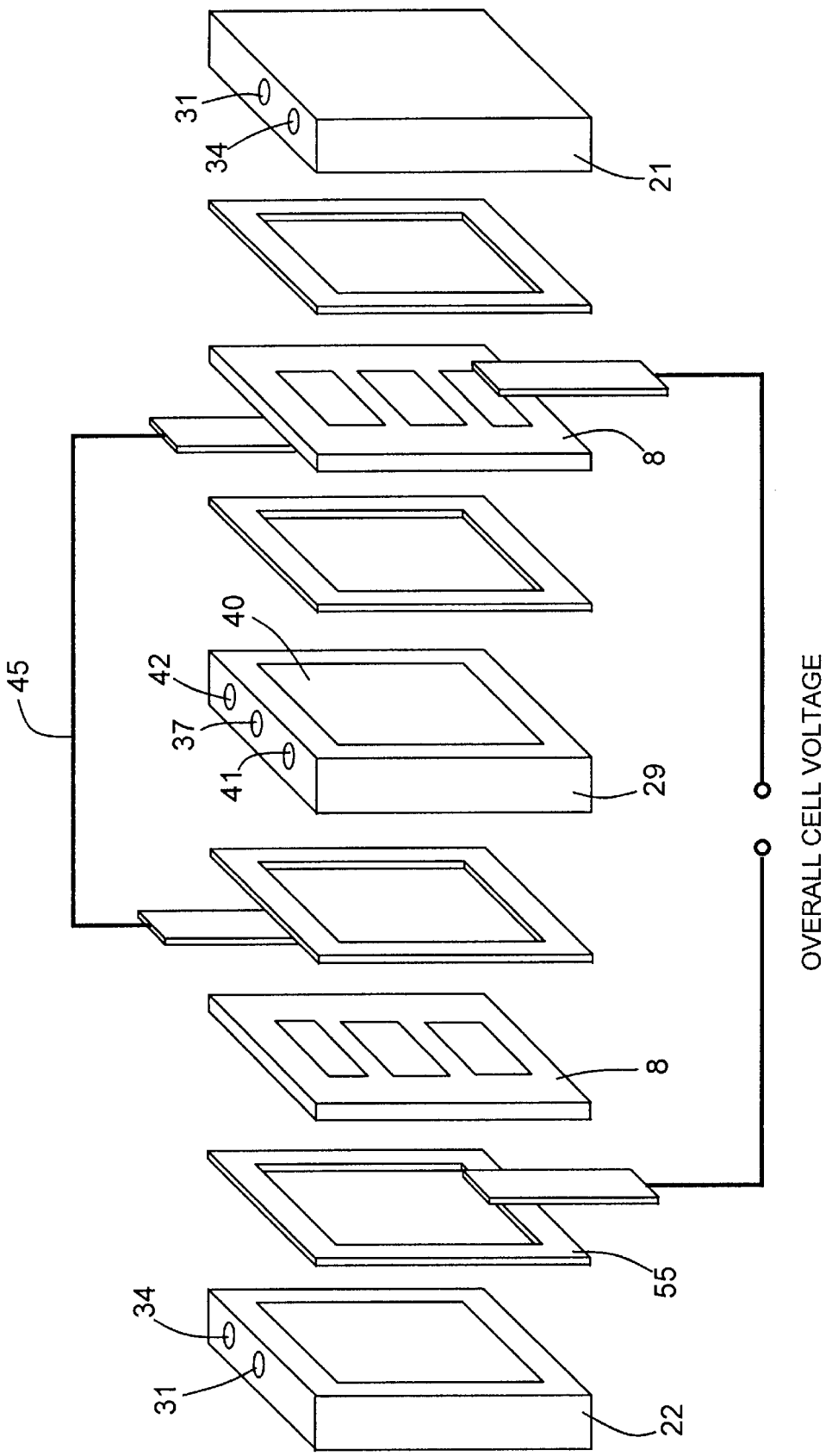
FIG. 8: illustrates similarly to FIG. 7 the complete construction of a fuel cell according to the invention.

FIG. 8 now shows the complete construction of a fuel cell according to the invention, similar to that in FIG. 7.

We claim:

1. A PEM fuel cell, comprising:
   (a) at least one strip membrane with at least two individual cells, each individual cell having a polymeric solid electrolyte membrane with a first and a second surface, a first electrode coating disposed on the first surface and a second electrode coating disposed on the second surface, the individual cells being connected in series;

(b) heat exchange and fuel gas feed plates being disposed on each side of the at least one strip membrane and supplying the electrode coatings of the individual cells with fuel, the heat exchange and fuel gas feed plates being made of non-conductive material or possessing non-conductive surfaces; and (c) conductive structures contacting the at least one strip membrane, at least two conductive structures being outwardly-directed with respect to the PEM fuel cell for voltage and current tapping.

2. The PEM fuel cell according to claim 1, wherein one strip membrane is provided and the heat exchange and fuel gas feed plates are arranged as end plates on each side of the strip membrane.

3. The PEM fuel cell according to claim 1, wherein 2 to 2000 strip membranes are arranged in the form of a fuel cell stack, the strip membranes being electrically connected, the heat exchange and fuel gas feed plates serving both as intermediate plates between adjacent strip membranes and also as end plates for a first and a last strip membrane of the fuel cell stack.

4. The PEM fuel cell according to claim 1, wherein the at least one strip membrane further comprises at least partly electronically conductive structures disposed on the electrode coatings of the individual cells between the heat exchange and fuel gas feed plates and the electrode coatings, the at least partly electronically conductive structures minimizing electrical losses across the electrode coating of the individual cell without short-circuiting electrode coatings of neighboring individual cells.

5. The PEM fuel cell according to claim 4, wherein the at least partly electronically conductive structures disposed on the electrode coatings form overall structures comprising alternating non-conductive areas and fuel-permeable conductive areas, the conductive areas being disposed on the electrode coatings.

6. The PEM fuel cell according to claim 5, wherein the overall structures and the conductive structures contacting the at least one strip membrane are one-piece structures.

7. The PEM fuel cell according to claim 1, wherein the heat exchange and fuel gas feed plates have, on the side facing the strip membrane, fuel distributor structures.

8. The PEM fuel cell according to claim 1, wherein the heat exchange and fuel gas feed plates include a porous material, the fuel supply being carried out through pores of the porous material.

9. The PEM fuel cell according to claim 1, wherein the heat exchange and fuel gas feed plates have ducts and/or cavities for the flow of a cooling medium.

10. The PEM fuel cell according to claim 3, wherein central supply ducts, passing through the entire fuel cell stack, for the flow of a cooling medium are provided.

11. The PEM fuel cell according to claim 7, wherein a fuel supply for the fuel distributor structures is carried out through ducts and/or cavities and/or pore structures.

12. The PEM fuel cell according to claim 1, wherein gaskets are disposed between each heat exchange and fuel gas feed plate and each strip membrane.

13. The PEM fuel cell according to claim 1, wherein the individual cells are connected in series such that the first electrode coating of a individual cell is connected with the second electrode coating of another individual cell via an electronically conductive area.

14. The PEM fuel cell according to claim 13, wherein an insulated area is disposed between the individual cells and the electronically conductive areas.

15. The PEM fuel cell according to claim 4, wherein the at least partly electronically conductive structures and the conductive structures contacting the at least one strip membrane are one-piece structures.

16. The PEM fuel cell according to claim 1, wherein the individual cells are connected in series in a stepped configuration such that the first electrode coating of a individual cell partially overlaps with the second electrode coating of another individual cell.

17. A PEM fuel cell, comprising:

(a) at least one strip membrane with at least two individual cells, each individual cell having a polymeric solid electrolyte membrane with a first and a second surface, a first electrode coating disposed on the first surface and a second electrode coating disposed on the second surface, the individual cells being connected in series in a stepped configuration such that the first electrode coating of one individual cell partially overlaps with the second electrode coating of another individual cell;

(b) heat exchange and fuel gas feed plates being disposed on each side of the at least one strip membrane and supplying the electrode coatings of the individual cells with fuel, the heat exchange and fuel gas feed plates being made of non-conductive material or possessing nonconductive surfaces; and (c) conductive structures contacting the at least one strip membrane, at least two conductive structures being outwardly-directed with respect to the PEM fuel cell for voltage and current tapping.

18. A PEM fuel cell, comprising:

(a) at least one strip membrane with at least two individual cells, each individual cell having a polymeric solid electrolyte membrane with a first and a second surface, a first electrode coating disposed on the first surface and a second electrode coating disposed on the second surface, the individual cells being connected in series;

(b) heat exchange and fuel gas feed plates being disposed on each side of the at least one strip membrane, the heat exchange and fuel gas feed plates having fuel distributor structures to supply the electrode coatings of the individual cells with fuel, the heat exchange and fuel gas feed plates being made of non-conductive material or possessing non-conductive surfaces; and (c) conductive structures contacting the at least one strip membrane, at least two conductive structures being outwardly-directed with respect to the PEM fuel cell for voltage and current tapping.

* * * * *